United States Patent
Higgins et al.

(10) Patent No.: US 9,862,418 B1
(45) Date of Patent: Jan. 9, 2018

(54) CROSS MEMBER WITH INNER FLANGES

(71) Applicant: TOYOTA MOTOR ENGINEERING & MANUFACTURING NORTH AMERICA, INC., Erlanger, KY (US)

(72) Inventors: Christopher M. Higgins, Ann Arbor, MI (US); Brian T. Thurgate, Ypsilanti, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/200,977

(22) Filed: Jul. 1, 2016

(51) Int. Cl.
*B62D 21/03* (2006.01)
*B62D 25/20* (2006.01)

(52) U.S. Cl.
CPC ......... *B62D 21/03* (2013.01); *B62D 25/2054* (2013.01)

(58) Field of Classification Search
CPC ........ B62D 21/03; B62D 21/04; B62D 21/09; B62D 21/20; B62D 25/20; B62D 25/2036; B62D 25/2054; B62D 33/02
See application file for complete search history.

(56) References Cited

U.S. PATENT DOCUMENTS

| | | | | |
|---|---|---|---|---|
| 4,631,891 A | * | 12/1986 | Donavich | B62D 25/2054 105/375 |
| 5,170,605 A | * | 12/1992 | Huddle | B60P 3/20 52/588.1 |
| 7,152,911 B1 | * | 12/2006 | McNulty | B62D 25/2054 296/184.1 |
| 7,543,384 B2 | | 6/2009 | Ni et al. | |
| 8,393,672 B2 | | 3/2013 | Mori | |
| 9,090,293 B1 | | 7/2015 | Courtright et al. | |
| 9,126,247 B2 | | 9/2015 | Kim | |
| 9,487,246 B2 | * | 11/2016 | Courtright | B62D 25/2027 |
| 2005/0040675 A1 | * | 2/2005 | Fitze | B62D 25/20 296/193.07 |
| 2005/0057060 A1 | * | 3/2005 | Edwards | B60P 7/0807 296/35.3 |
| 2008/0222974 A1 | * | 9/2008 | Perkowski | B62D 29/02 52/127.1 |
| 2011/0298245 A1 | * | 12/2011 | Jarocki | B62D 21/03 296/193.07 |
| 2013/0038087 A1 | * | 2/2013 | Woodard, Jr. | B62D 25/2054 296/182.1 |

(Continued)

FOREIGN PATENT DOCUMENTS

DE 102012019853 A1 4/2014
EP 2808232 A1 12/2014

*Primary Examiner* — Gregory Blankenship
(74) *Attorney, Agent, or Firm* — Oblon, McClelland, Maier & Neustadt, L.L.P.

(57) ABSTRACT

A cross member including a base including a first side wall inclined at a first angle with the base and a second side wall inclined at a second angle with the base creating a hollow portion between the first side wall and a second side wall, a first outer flange and a second outer flange projecting from the first side wall and the second side wall, respectively, in a direction away from the hollow portion, and a first inner flange projecting from a top side of the first side wall into the hollow portion, wherein the base, the first side wall and the second side wall, the first outer flange and the second outer flange, and the first inner flange form an open cross-section.

20 Claims, 9 Drawing Sheets

(56) References Cited

U.S. PATENT DOCUMENTS

| | | | |
|---|---|---|---|
| 2013/0119710 A1* | 5/2013 | De Luca | B62D 25/20 296/193.07 |
| 2013/0313860 A1* | 11/2013 | Yamaji | B62D 25/20 296/193.07 |
| 2016/0001816 A1 | 1/2016 | Aitharaju et al. | |

* cited by examiner

CROSS MEMBER WITH INNER FLANGES

BACKGROUND

Field of the Disclosure

This application relates generally to improvements to a structural member for application to a frame member of a vehicle. More particularly, the present disclosure relates to improvements relating to a cross member for supporting a load on a floor of the vehicle.

Description of the Related Art

A cross member of a floor of a vehicle (e.g., a bed of a cargo area of a truck) provides structural support for among other things, a load acting downwards on the bed. For instance, the cross member is designed to support the bed of the truck when heavy objects are dropped onto the bed. The cross member spans the width of the bed, and is disposed on the underside of the bed.

Conventionally, the cross member has a U-shaped cross-section with outer flanges. The cross member structure includes a pair of side walls, a base, and outer flanges. The side walls are substantially perpendicular to the base and support compression and bending caused due to the load acting in a vertical direction, i.e., perpendicular to the base.

A vertical load can also cause buckling in the side walls of the cross member. In order to prevent the buckling due to a compressive stress, it is necessary to improve the stiffness (rigidity) of the compression side. For that purpose, conventional framework members for vehicles are provided with a number of reinforcing members for the compression-side surface and the vertical wall part. As a result, the mass and the cost are unfavorably increased.

SUMMARY

According to an embodiment of the present disclosure, there is provided a cross member. The cross member including a base including a first side wall inclined at a first angle with the base and a second side wall inclined at a second angle with the base creating a hollow portion between the first side wall and a second side wall, a first outer flange and a second outer flange projecting from a top side of the first side wall and the second side wall, respectively, in a direction away from the hollow portion, and a first inner flange projecting from the top side of the first side wall into the hollow portion, where the base, the first side wall and the second side wall, the first outer flange and the second outer flange, and the first inner flange form an open cross-section.

Further, there is provided a cross member including a base, a first side wall inclined at a first angle with the base and a second side wall inclined at a second angle with the base creating a hollow portion between the first side wall and a second side wall. A first outer flange and a second outer flange projecting from a top side of the first side wall and the second side wall, respectively, in a direction away from the hollow portion is formed. A third outer flange and a fourth outer flange projecting from the base, respectively, is formed in a direction away from the hollow portion. Furthermore, a first inner flange is projecting from the top side of the first side wall into the hollow portion, where the base, the first side wall and the second side wall, the first outer flange and the second outer flange, the third outer flange and the fourth outer flange, and the first inner flange form an open cross-section.

Furthermore, there is provided a cross member including a base, a first side wall inclined at a first angle with the base and a second side wall inclined at a second angle with the base creating a hollow portion between the first side wall and a second side wall. A first outer flange and a second outer flange is projecting from the base in a direction away from the hollow portion. A first inner flange and a second inner flange is projecting from a top side the first side wall and the second side wall, respectively, into the hollow portion, where the base, the first side wall and the second side wall, the first outer flange and the second outer flange, and the first inner flange and the second inner flange form an open cross-section.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Furthermore, the terms "approximately," "proximate," "substantially," and similar terms generally refer to ranges that include the identified value within a margin of 20%, 10% or preferably 5% in certain embodiments, and any values therebetween. The term "top," "inner," "outer," and the like that may be used herein merely describe points of reference and do not necessarily limit embodiments of the present disclosure.

Figure 1A:
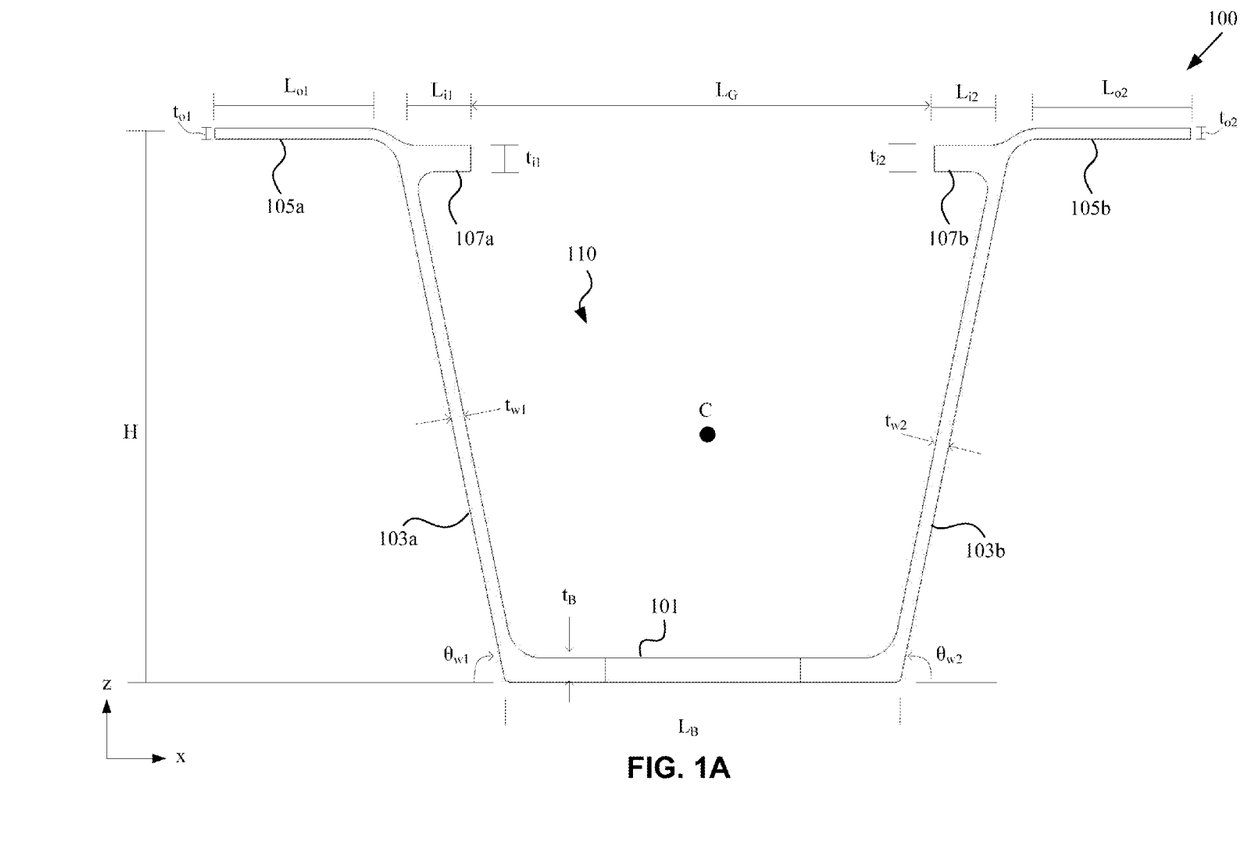
FIG. 1A is an elevation view of a cross member according to an exemplary embodiment of the present disclosure.

FIG. 1A is an elevation view of a cross member 100 according to an exemplary embodiment. The cross member 100 is a support element that provides reinforcement or support to a load bearing member such as a floor of a truck. The cross member 100 has an open cross-section which includes a base 101, side walls 103a and 103b (also referred as side walls 103 hereinafter), outer flanges 105a and 105b (also referred as outer flanges 105 hereinafter), and inner flanges 107a and 107b (also referred as inner flanges 107 hereinafter).

The side walls 103a and 103b are formed at an angle with respect to the base 101 forming a V-like shape and creating a hollow portion 110 between the sidewalls 103a and 103b. Further, the outer flanges 105a and 105b are formed at one end of the side wall 103a and 103b, respectively. For example, the outer flange 105a extends away and the outer flange 105b extends away from the hollow portion 110. In addition, the inner flanges 107a and 107b are formed at one end (same end as the outer flanges 105) of the side wall 103a and 103b, respectively. For example, the inner flange 107a extends inwards and the inner flange 107b extends inwards into the hollow portion 110. The outer flanges 105 and the inner flanges 107 are parallel or substantially parallel to the base 101.

Figure 6A:
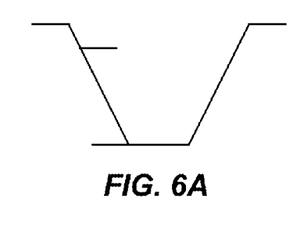
FIGS. 6A-6M illustrate different configurations of the cross member according to an exemplary embodiment of the present disclosure.
Figure 6B:
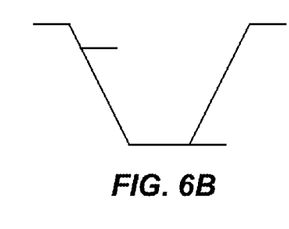
Figure 6C:
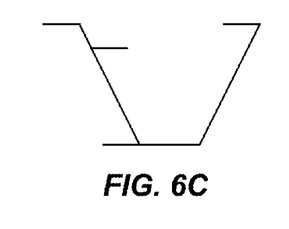
Figure 6D:
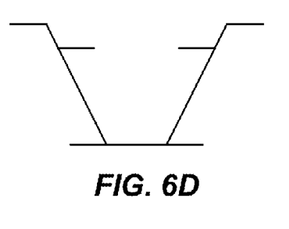
Figure 6E:
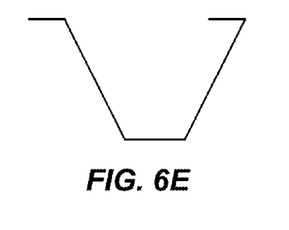
Figure 6F:
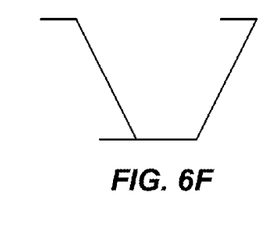
Figure 6G:
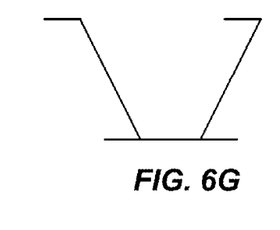
Figure 6H:
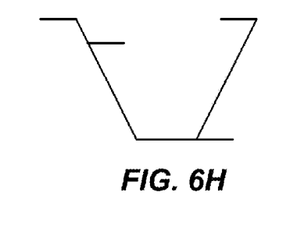
Figure 6I:
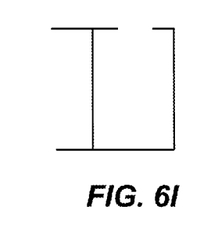
Figure 6J:
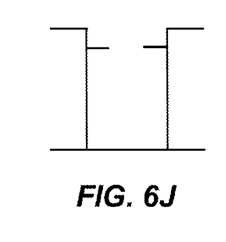
Figure 6K:
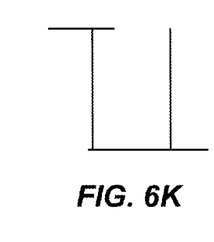
Figure 6L:
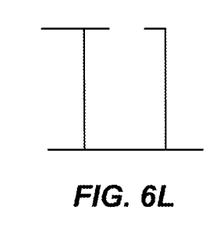
Figure 6M:
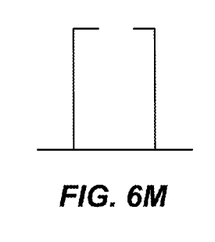

The inner flanges 107 can be offset relative the outer flange 105 in the z-direction. In one embodiment, the outer flanges 105 and the inner flanges 107 can also be located at an end of the sidewalls 103 distal from the base 101. Further, referring to FIG. 1C, only one inner flange may be included at a top side of the side walls to form a first cross member 100C. Alternatively or in addition, referring to FIG. 1D, the outer flanges 105 can be formed projecting from the base 101 to form a second cross member 100D. It can be understood by a person skilled in art that several variations of the configuration can be achieved by varying the location of one or more outer flanges at the top side of the side walls, one or more outer flanges projecting from the base, and one or more inner flanges. FIGS. 6A-6M illustrate possible variations in the configurations of the cross member 100. Additional variations in configuration the cross member 100 are possible as well. In certain situations with space limitations, for example, when supporting the floor close to the edge of the floor; the cross members such as in FIGS. 6E, 6F, and 6I can be more useful compared to the cross members in FIG. 6A, 6B or 6D.

The cross member 100 can have a variable thickness and length. For example, the base 101 has a thickness $t_B$ and a length $L_B$. The side walls 103a and 103b have a thickness $t_{w1}$ and $t_{w2}$, respectively, and are inclined at an angle $\theta_{w1}$ and $\theta_{w2}$, respectively, with respect to the base 101. The angles of the side walls 103 can be greater than 0° and less than 90°. The side walls 103 inclined at an angle to the base 101 are less likely to buckle and more likely to spread outwards or open up compared to vertical sides wall that are inclined at approximately 90°, since the side walls 103 will experience a bending moment at a connection with the base 101 due to the force acting on the outer flanges 105. However, a floor is attached to the outer flanges 105 that can keep the shape of the side walls 103 intact under loading conditions.

The outer flanges 105a and 105b have a thickness $t_{o1}$ and $t_{o2}$, respectively, and a length $L_{o1}$ and $L_{o2}$, respectively. The outer flanges 105 are at a height H from the base 101. The lengths $L_{o1}$ and $L_{o2}$ can vary depending on the space limitation, for example, $L_{o2}$ can be comparatively shorter than $L_{o1}$ when the cross member 100 is attached at an edge of the floor 200. Similarly, the angles $\theta_{w1}$ and $\theta_{w2}$ of the side walls 103 due to space constraints.

The inner flanges 107a and 107b have a thickness of $t_{i1}$ and $t_{i2}$, respectively, and a length $L_{i1}$ and $L_{i2}$, respectively. Furthermore, a gap $L_G$ is maintained between the inner flanges 107a and 107b to form an open cross section of the cross member 100. The gap $L_G$ can allow assembly of additional components within the hollow portion 110. The lengths $L_{i1}$ and $L_{i2}$ can vary depending on the space limitation or components installed in the hollow portion 110, for example, $L_{i2}$ can be comparatively shorter than $L_{i1}$.

The thickness and length, respectively, of the outer flanges 105 can be substantially similar. Also, the thickness and length, respectively, of the inner flanges 107 can be substantially similar. Furthermore, the side walls 103 can have a substantially similar thickness and angles, respectively. As such, the cross member 100 can have a substantially symmetric cross-section. However, the present disclosure is not limited to aforementioned lengths, thickness, and angles and variations in the aforementioned dimensions are possible. For example, an asymmetric cross-section can be formed by constructing the side wall 103a thicker than the side wall 103b, by constructing the angles angle $\theta_{w1}$ and $\theta_{w2}$ different from each other, or a combination thereof.

The side walls 103 can have a thickness less than that of the base 101. Additional material can be added to the base 101, the outer flanges 105, the inner flanges 107 or a combination thereof, to increase the area moment of inertia (I-value hereinafter). The I-value of the cross member 100 can be greater than the I-value of a U-shaped cross member having a generally uniform wall and substantially similar total mass as the cross member 100. Alternatively or in addition, the I-value of the cross member 100 can be increased, while keeping the total mass substantially unaffected, by adding material to the outer flanges 105 and (or) the inner flanges 107. For instance, the length, thickness, or both of the outer flanges 105 and/or the inner flanges 107 can be increased. As such, material can be spread away from the centroid C providing greater stability and structural strength to the cross member 100 relative to cross members having uniform wall thickness and substantially similar mass.

The cross member 100 can be made of lesser volume of material compared to a U-shaped cross-member. In such case, the cross member 100 will have a lower mass with an equivalent I-value compared to the U-shaped cross member. For example, the cross member 100 and the U-shaped cross member may have similar I values, but the cross member 100 may be formed of less material, for instance, over 10% mass saving can be realized.

The cross member 100 can be made from various materials including but not limited to aluminum, cast iron, and steel. The cross member 100 can be manufactured using various manufacturing processes, for example, extrusion, casting, molding, injection molding (e.g., when the cross member 100 is made of plastic material). The manufacturing process can impose limitation on the minimum or maximum dimensions of the cross member 100 discussed earlier.

Figure 1B:
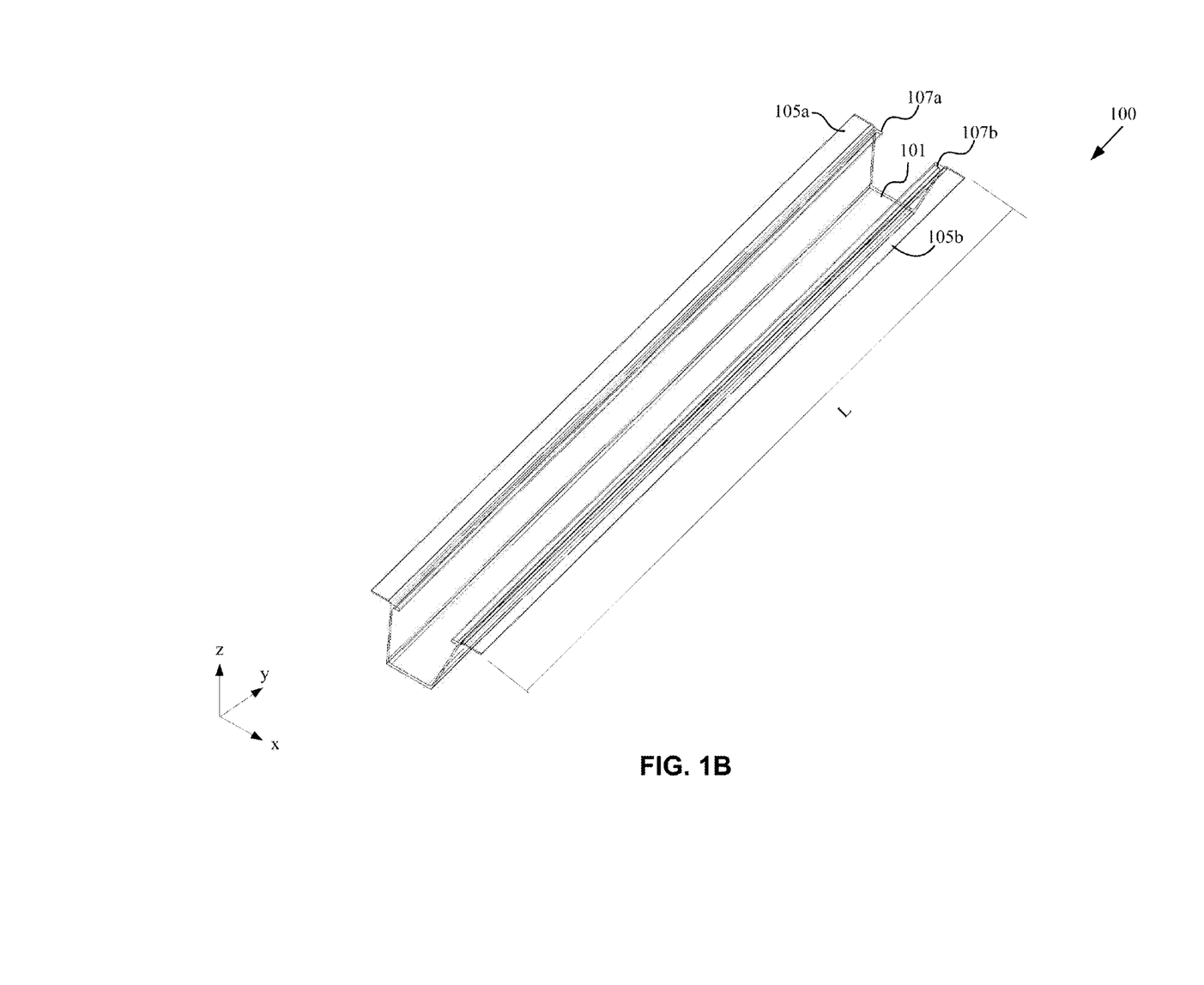
FIG. 1B is a perspective view of the cross member according to an exemplary embodiment of the present disclosure.
Figure 1C:
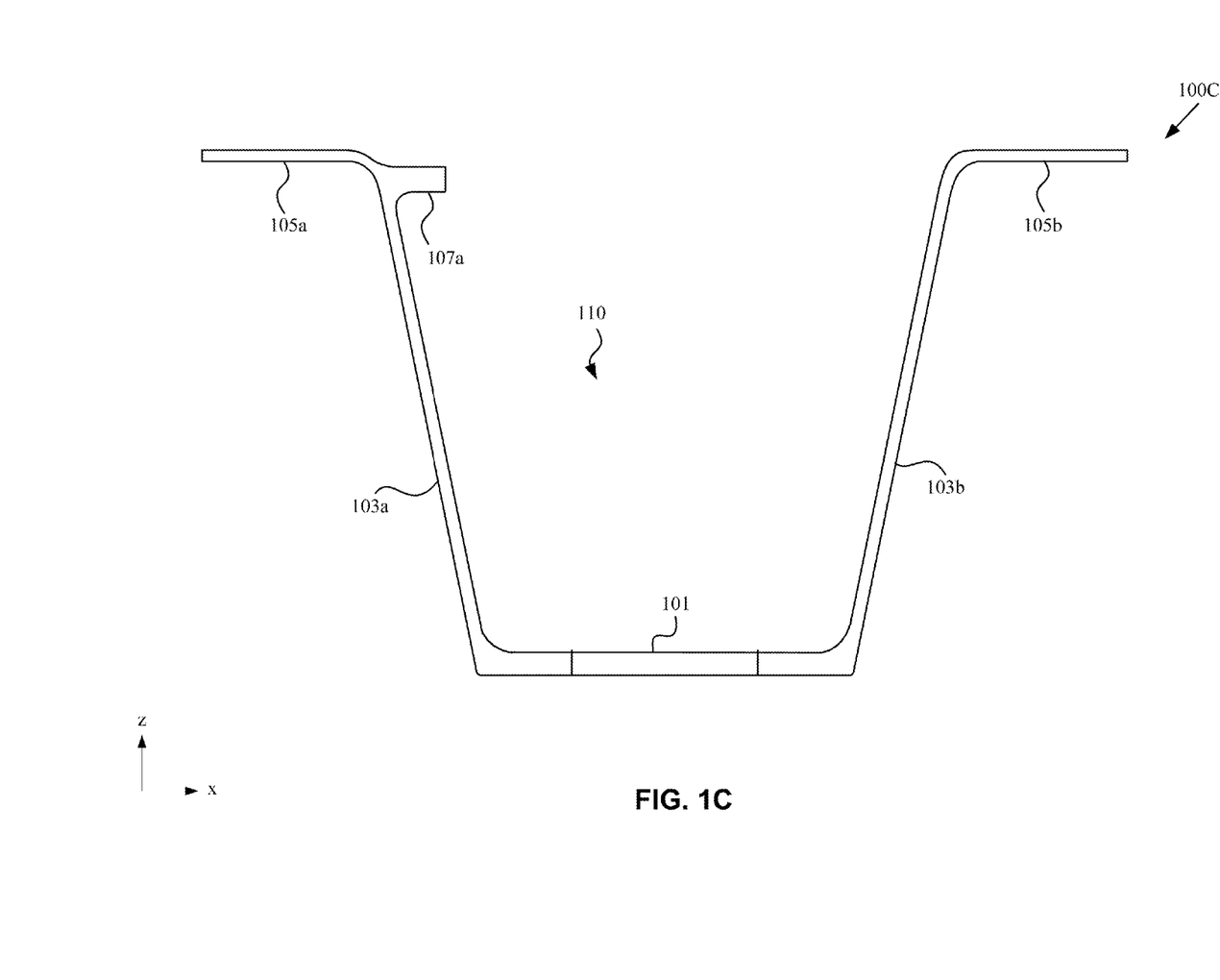
FIG. 1C is an elevation view of a cross member with one inner flange according to an exemplary embodiment of the present disclosure.
Figure 1D:
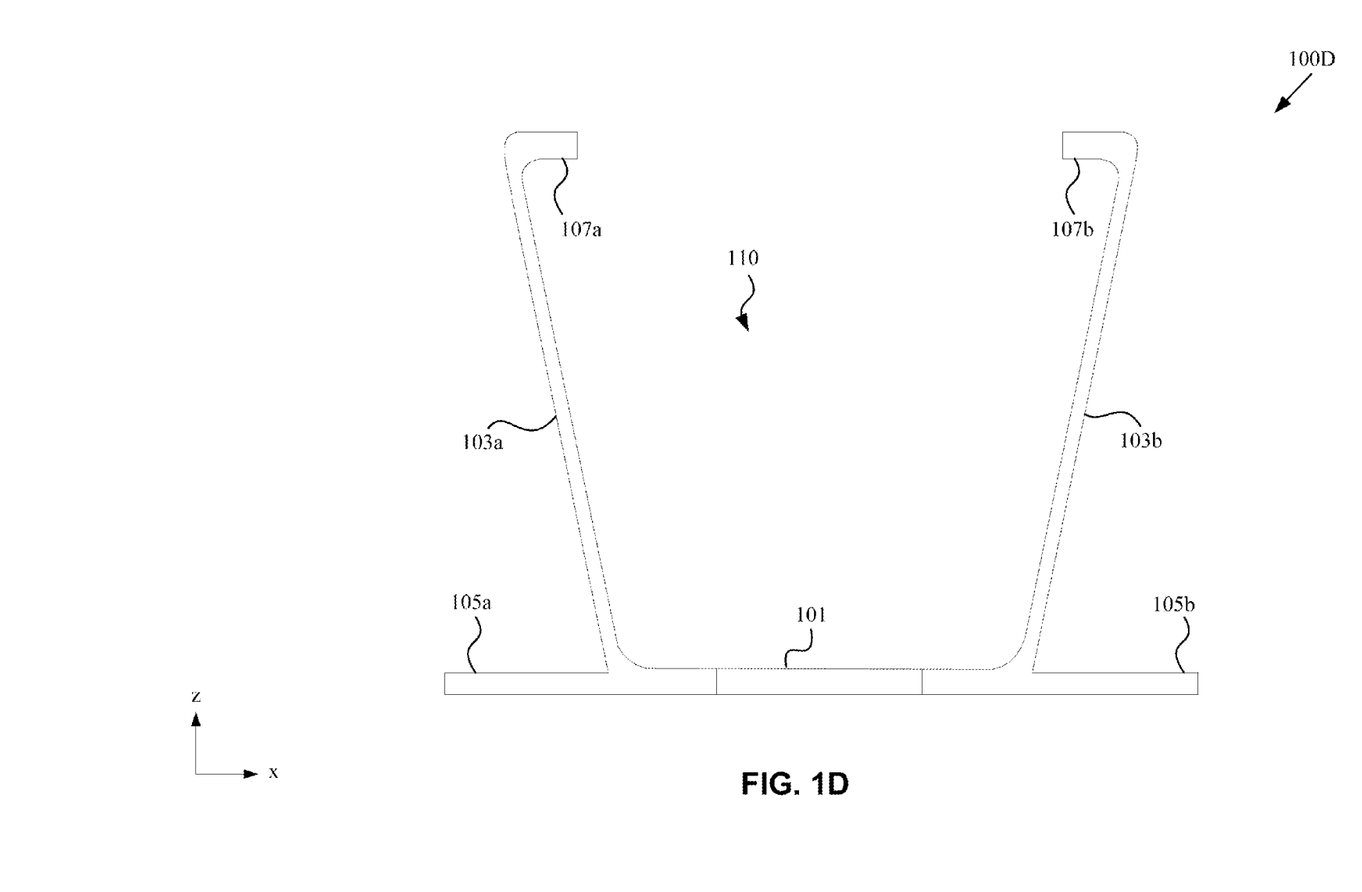
FIG. 1D is an elevation view of a cross member with outer flanges at the bottom according to an exemplary embodiment of the present disclosure.

FIG. 1B illustrates a perspective view of the cross member 100 according to an exemplary embodiment of the present disclosure. The cross member 100 is manufactured using the extrusion process. The cross member 100 has a length L; the inner flanges 103 and the outer flanges 105 extend along the entire length L. In certain embodiments, additional components can be attached to the cross member 100 in a sliding manner or can be fixed using fasteners such as screw, nuts and bolts, or adhesive. The inner flanges 107 and/or the outer flanges 105 can be modified to attach an additional component, to reduce the weight, etc. For example, a portion of the inner flanges 107 and/or the outer flanges 105 can be cut out. Holes may be drilled in the inner flanges 107, the outer flanges 105, the base 101, or a combination thereof to attach additional components to the cross member 100.

Figure 2:
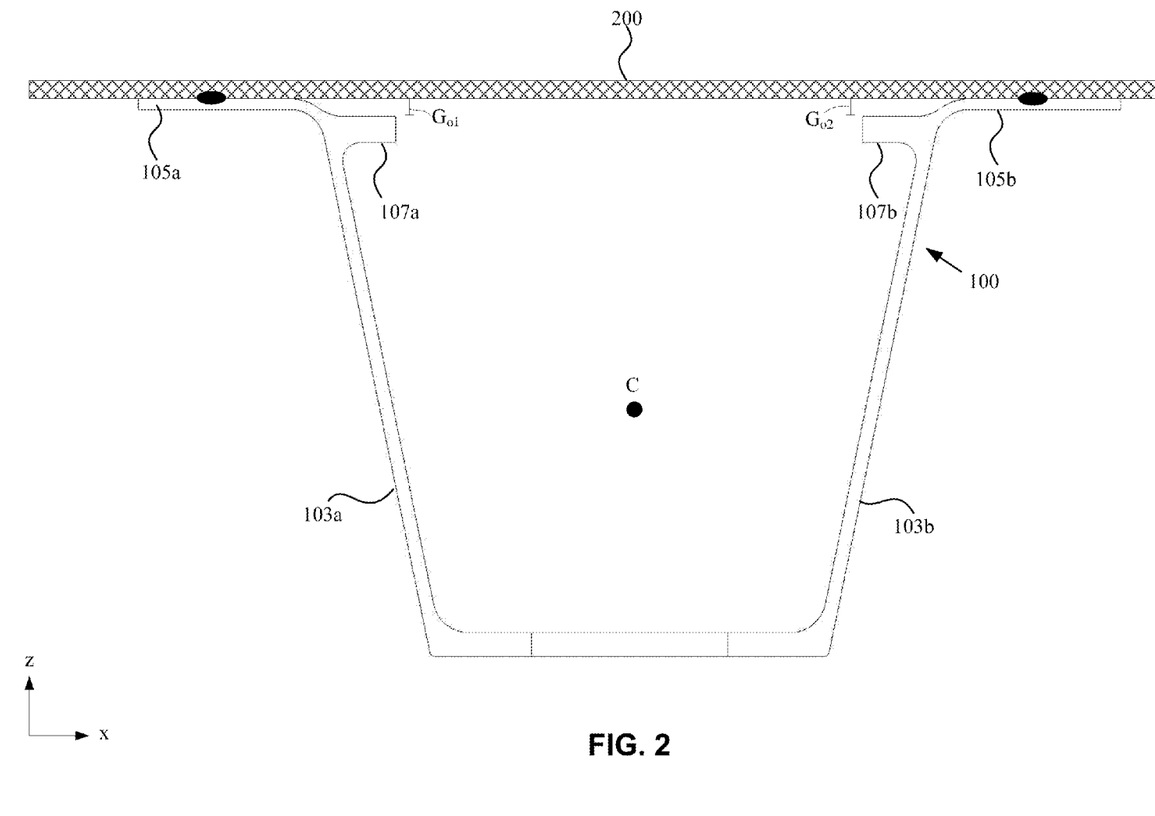
FIG. 2 illustrates an assembly of the cross member and a floor according to an exemplary embodiment of the present disclosure.

FIG. 2 illustrates an assembly of the cross member 100 and a floor 200 according to an exemplary embodiment. The floor 200 can be welded to the outer flanges 105 of the cross member 100. The outer flanges 105 can be fixed to the underside of the floor 200 by spot weld or other joining technology. The inner flanges 107 separated from the floor 200 by gaps $G_1$, and $G_2$, since the inner flanges 107 are slightly offset relative to the outer flanges 105. The construction of the inner flanges 107 can provide several advantages in an assembled condition.

The gaps $G_1$, and $G_2$ can prevent the inner flanges 107 from coming in contact with the floor 200 and prevent any potential noise that may be generated due to a surface-to-surface contact (e.g., metal-to-metal contact), under normal operating conditions. In case of an excess loading condition or while driving on an uneven road, the inner flanges 107 can provide extra support to the floor 200 as the floor 200 may buckle.

The floor 200 can be attached to one of the outer flanges 105a or 105b, one inner flange 107a or 107b, both the inner flanges 107, or a combination thereof. Accordingly, the offset between the outer flange 105 and the inner flange 107 may be modified.

The floor 200 can be removably attached to the cross member 100 using fasteners such as screws, and bolts. Further, rubber inserts may be added to reduce any noise that may be generated during operation due to use of fasteners.

Figure 3:
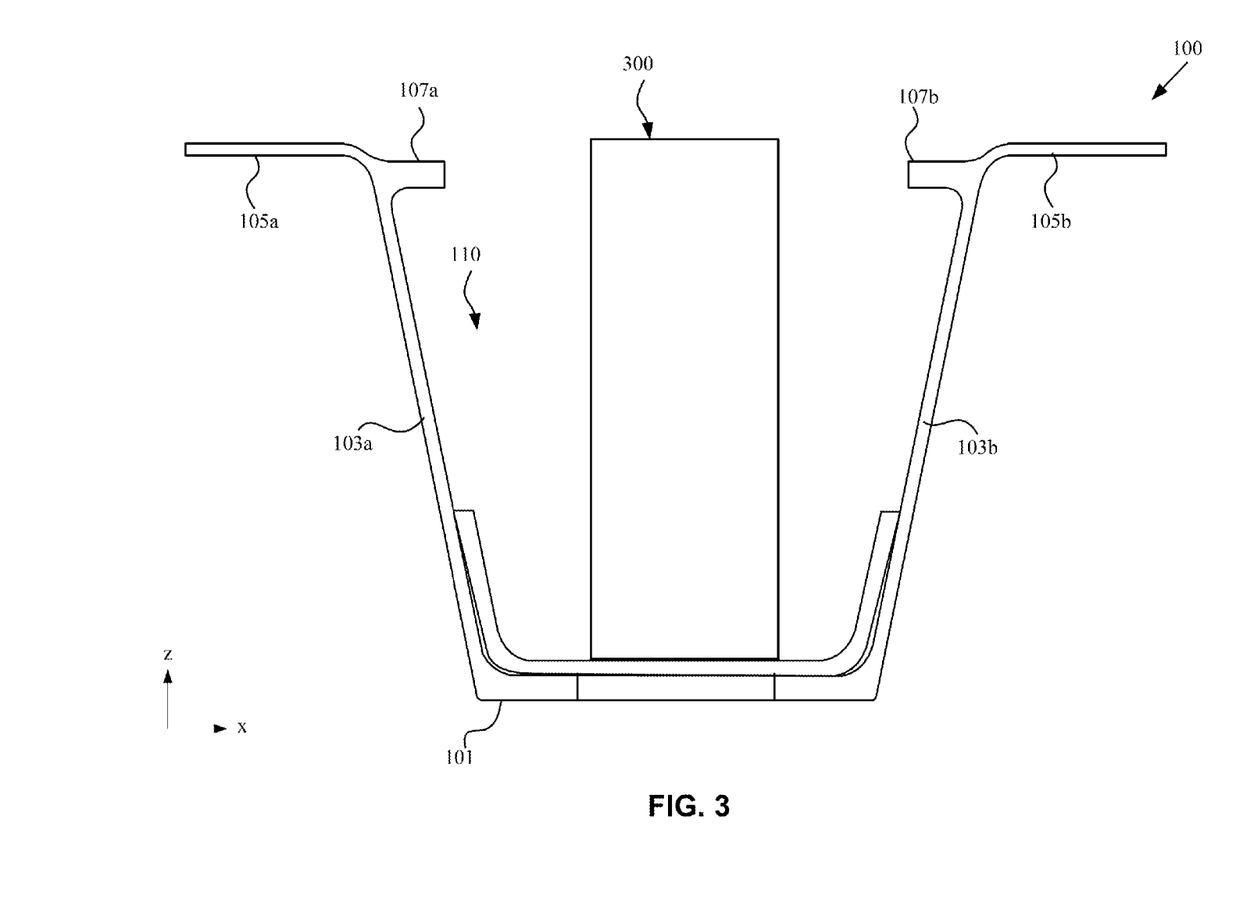
FIG. 3 illustrates an assembly of the cross member and a bracket according to an exemplary embodiment of the present disclosure.

FIG. 3 illustrates an assembly of the cross member 100 and a bracket 300 according to an exemplary embodiment. The bracket 300 can be placed in the hollow portion 110 between the side walls 103 and rest on the base 101. The bracket 300 can be included to provide additional support to the floor 200, for example, by sharing a load F acting vertically downwards on the floor 200.

Figure 4:
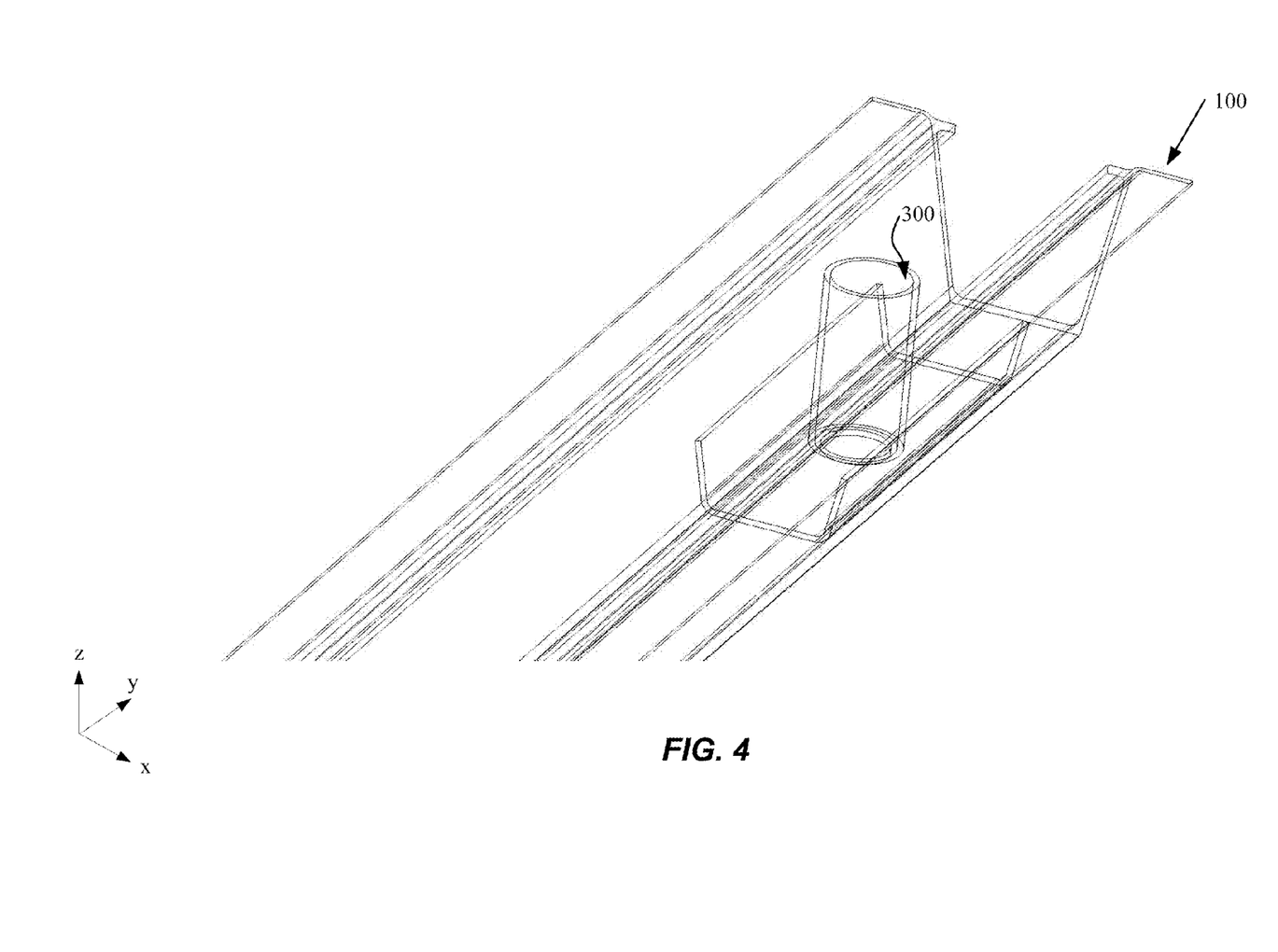
FIG. 4 is perspective view illustrating an assembly of the cross member and the bracket according to an exemplary embodiment of the present disclosure.

FIG. 4 is a perspective view illustrating an assembly of the cross member and the bracket 300 according to an exemplary embodiment. The bracket 300 can be installed along the length of the cross member 100. Further, the bracket 300 can be fixed or installed in a sliding manner to the cross member 100.

Figure 5:
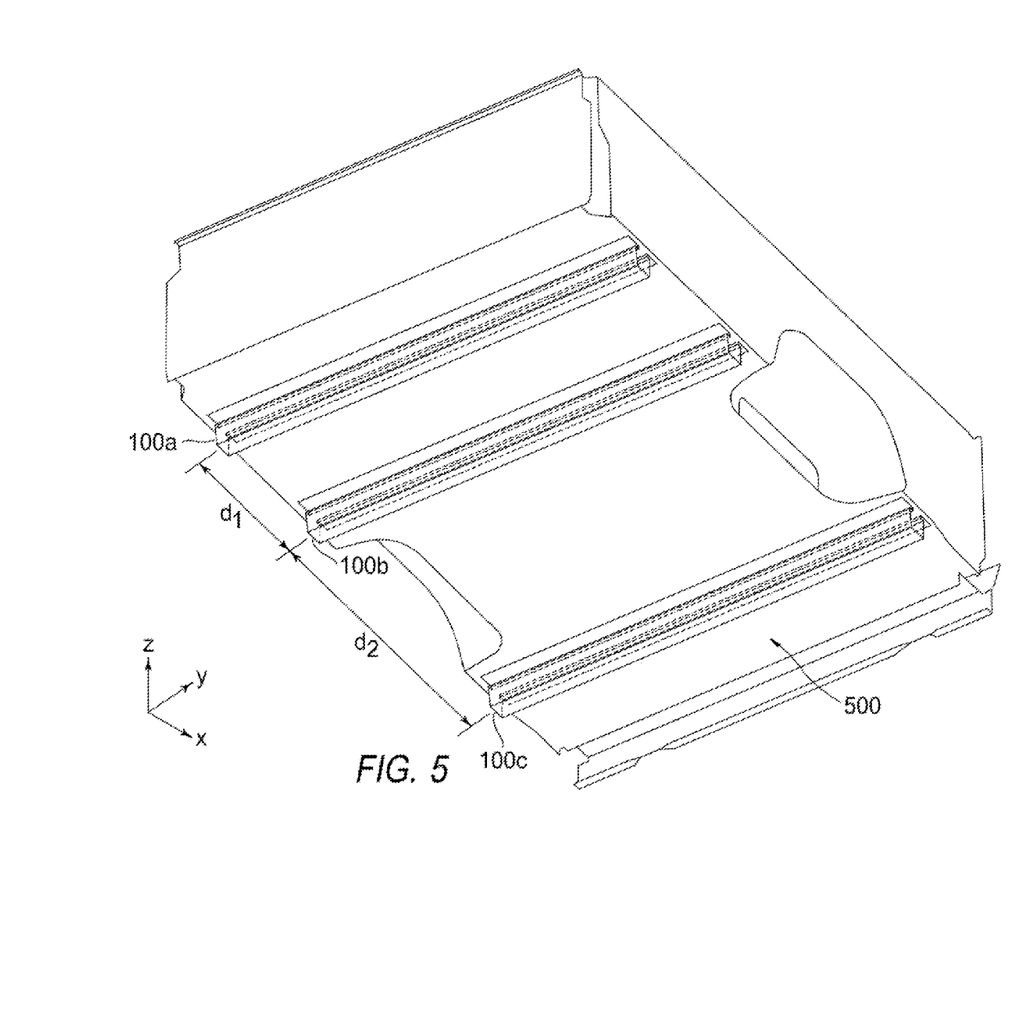
FIG. 5 illustrates an assembly of several cross members and a floor of a truck according to an exemplary embodiment of the present disclosure.

FIG. 5 illustrates an assembly of several cross members and a bed 500 of a truck according to an exemplary embodiment. The cross members 100a, 100b, and 100c can be attached underneath the bed 500 of a cargo area of the truck. The cross members 100a and 100b can be arranged at a distance $d_1$ apart; while the cross members 100b and 100c can be separated by distance $d_2$. The cross members 100a, 100b and 100c can be arranged equidistance (i.e., $d_1$ substantially equal to $d_2$) from each other. Alternatively or in addition, the cross members 100a, 100b and 100c can be arranged at a non-uniform distance (i.e., $d_1$ substantially different from $d_2$) from each other.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A cross member comprising:
   a base including a first side wall inclined at a first angle with the base and a second side wall inclined at a second angle with the base creating a hollow portion between the first side wall and a second side wall;
   a first outer flange and a second outer flange projecting from a top side of the first side wall and the second side wall, respectively, in a direction away from the hollow portion; and
   a first inner flange projecting from the top side of the first side wall into the hollow portion, wherein the base, the first side wall and the second side wall, the first outer flange and the second outer flange, and the first inner flange form an open cross-section, wherein
   the first inner flange is offset from the first outer flange towards the base to avoid contact with a floor attached to the first outer flange.

2. The cross member according to claim 1, further comprising a second inner flange projecting from the second side wall into the hollow portion forming a symmetric cross-section.

3. The cross member according to claim 2, wherein the second inner flange is offset from the second outer flange towards the base to avoid contact with the floor attached to the second outer flange.

4. The cross member according to claim 2, wherein the second outer flange is offset from the second inner flange towards the base to avoid contact with the floor attached to the second inner flange.

5. The cross member according to claim 2, wherein the first inner flange and the second inner flange are separated by a gap to allow installation of external components in the hollow portion.

6. The cross member according to claim 1, wherein the first angle and the second angle is greater than 0° and less than 90°.

7. A cross member comprising:
   a base including a first side wall inclined at a first angle with the base and a second side wall inclined at a second angle with the base creating a hollow portion between the first side wall and a second side wall;

a first outer flange and a second outer flange projecting from a top side of the first side wall and the second side wall, respectively, in a direction away from the hollow portion; and a first inner flange projecting from the top side of the first side wall into the hollow portion, wherein the base, the first side wall and the second side wall, the first outer flange and the second outer flange, and the first inner flange form an open cross-section, wherein the first outer flange is offset from the first inner flange towards the base to avoid contact with a floor attached to the first inner flange.

8. The cross member according to claim 7, further comprising a second inner flange projecting from the second side wall into the hollow portion forming a symmetric cross-section.

9. The cross member according to claim 8, wherein the second inner flange is offset from the second outer flange towards the base to avoid contact with the floor attached to the second outer flange.

10. The cross member according to claim 8, wherein the second outer flange is offset from the second inner flange towards the base to avoid contact with the floor attached to the second inner flange.

11. The cross member according to claim 8, wherein the first inner flange and the second inner flange are separated by a gap to allow installation of external components in the hollow portion.

12. The cross member according to claim 7, wherein the first angle and the second angle is greater than 0° and less than 90°.

13. A cross member comprising:

a base including a first side wall inclined at a first angle with the base and a second side wall inclined at a second angle with the base creating a hollow portion between the first side wall and a second side wall;

a first outer flange and a second outer flange projecting from a top side of the first side wall and the second side wall, respectively, in a direction away from the hollow portion; and a first inner flange projecting from the top side of the first side wall into the hollow portion, wherein the base, the first side wall and the second side wall, the first outer flange and the second outer flange, and the first inner flange form an open cross-section, wherein the first side wall and the second side wall have a thickness less than a thickness of the base.

14. The cross member according to claim 13, further comprising a second inner flange projecting from the second side wall into the hollow portion forming a symmetric cross-section.

15. The cross member according to claim 14, wherein the second inner flange is offset from the second outer flange towards the base to avoid contact with a floor attached to the second outer flange.

16. The cross member according to claim 14, wherein the second outer flange is offset from the second inner flange towards the base to avoid contact with a floor attached to the second inner flange.

17. The cross member according to claim 14, wherein the first inner flange and the second inner flange are separated by a gap to allow installation of external components in the hollow portion.

18. The cross member according to claim 13, wherein the first angle and the second angle is greater than 0° and less than 90°.

19. The cross member according to claim 13, wherein the first inner flange is offset from the first outer flange towards the base to avoid contact with a floor attached to the first outer flange.

20. The cross member according to claim 13, wherein the first outer flange is offset from the first inner flange towards the base to avoid contact with a floor attached to the first inner flange.

* * * * *